United States Patent [19]

Hartlage

[11] Patent Number: 4,648,772

[45] Date of Patent: Mar. 10, 1987

[54] THREE-KNIFE CUTTING MACHINE WORKFEED

[75] Inventor: Jürgen Hartlage, Langenhagen, Fed. Rep. of Germany

[73] Assignee: H. Wohlenberg KG GmbH & Co., Hanover, Fed. Rep. of Germany

[21] Appl. No.: 808,878

[22] Filed: Dec. 13, 1985

[30] Foreign Application Priority Data

Dec. 29, 1984 [DE] Fed. Rep. of Germany ....... 3447798

[51] Int. Cl.[4] .............................................. B65G 59/06

[52] U.S. Cl. ...................................... 414/115; 83/281; 83/417; 83/925 A; 271/138; 414/131; 414/907

[58] Field of Search ........................ 414/115, 131, 907; 271/35, 124, 125, 138, 137, 142; 221/12; 83/925 A, 281, 417

[56] References Cited

U.S. PATENT DOCUMENTS

| | | | |
|---|---|---|---|
| 1,514,110 | 11/1924 | Still | 271/142 |
| 3,290,042 | 12/1966 | Johnson et al. | 271/138 |
| 3,871,642 | 3/1975 | Mariaux et al. | 271/138 |
| 3,892,319 | 7/1975 | Sarring | 414/115 |

*Primary Examiner*—Frank T. Yost

*Attorney, Agent, or Firm*—Dressler, Goldsmith, Shore, Sutker & Milnamow, Ltd.

[57] ABSTRACT

A three-knife cutting machine for trimming the front side and the head- and foot-side of brochures, books, and the like, in which the products to be trimmed are slidable in stacks with the back side forward from a magazine charged from above downward by carriers adjustable to the desired stack height to the cutting station, and in which there is provided a shutter, likewise adjustable in height, by facing the back of the products to be trimmed, which serves for retaining the products remaining over the stack to be led off. In order to prevent, in the case of differing height of the stack at the back with respect to the front side, a gap from arising between the lower end of the shutter and the surface of the led-off stack, control means are provided, by which, after the back of the led-off stack has passed the shutter, a relative movement can be established between the shutter and the led-off stack in such a way that the shutter remains in contact with the surface of the led-off stack during the entire sliding-out movement. Even in the case of thin products, in this manner the lowest product is prevented from being carried along by friction from the retained stack.

11 Claims, 4 Drawing Figures

THREE-KNIFE CUTTING MACHINE WORKFEED

Figure 1:
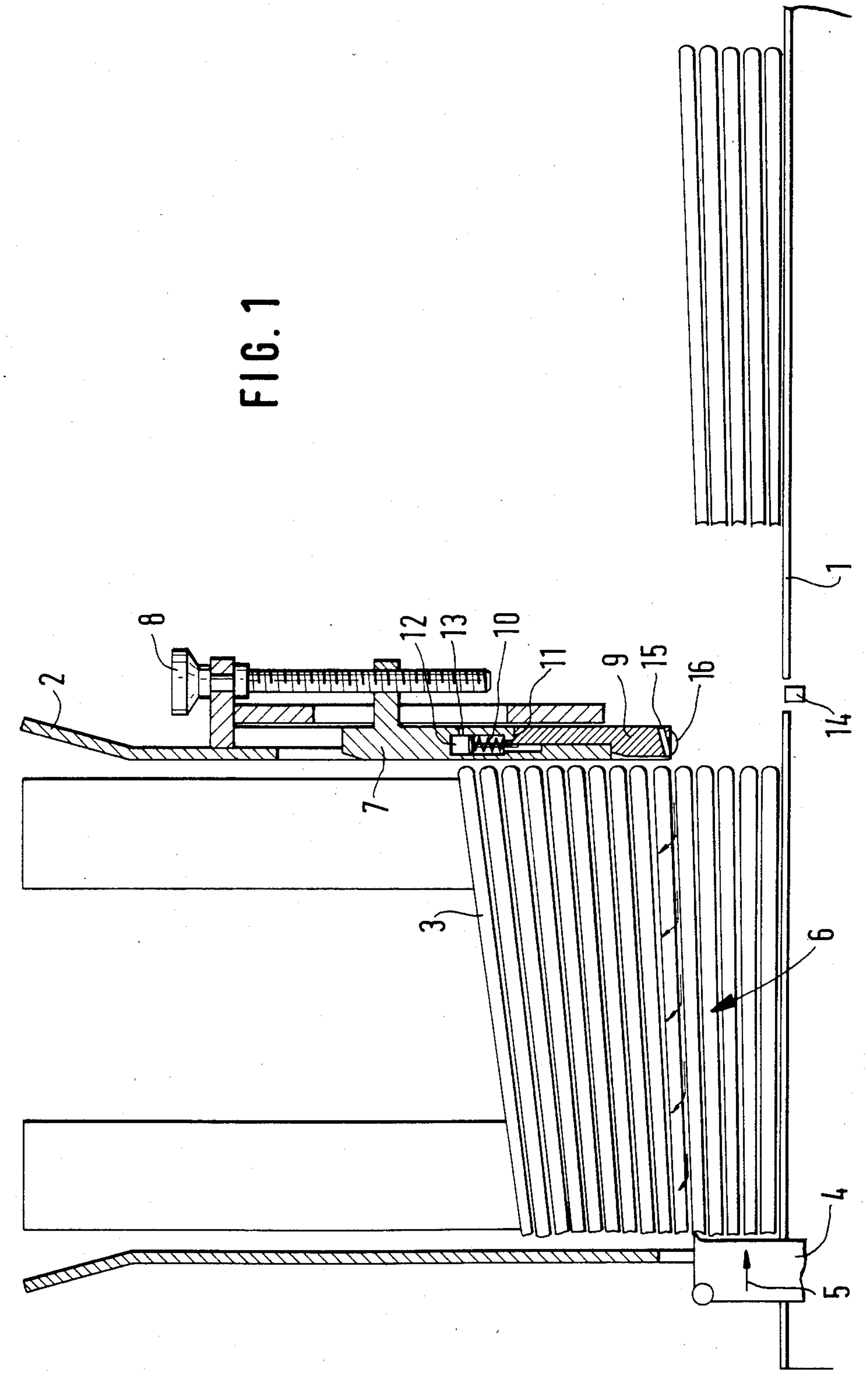

The invention relates to a three-knife cutting machine for trimming the front side and the head- and foot-side of brochures, books, and the like, in which the products to be trimmed are slidable to the cutting station in stacks with the back side forward from a magazine continuously charged from above by carriers or pushers adjustable to the desired stack height, and in which a shutter, likewise adjustable in height, facing the back side of the products to be trimmed is provided, which serves to retain the products remaining over the stack to be led off.

In known machines of this type, it is usual practice to adjust the height of the shutter according to the thickness that is presented by a stack to be led off on its back side facing the shutter.

According to experience, however, adhesive-bound products are thicker at the back than at the front. With several products stacked one over another, there is thereby yielded a gradient from the back to the front side. This leads to the result that with width increasing sliding-through of the stack under the shutter the distance between the stack and the shutter becomes greater. As a consequence of this, it can occur that in the drawing-off of thin products, according to the amount of the difference between back and front sides the air gap between the shutter and the stack surface becomes too great. If this air gap mounts about to one product thickness, then another of the retained products can be carried along by friction, which can lead to subsequent interruptions of operation or breakage in the machine.

Underlying the invention is the problem, in the case of a three-knife cutting machine of the type mentioned at the outset, of assuring a trouble-free rejecting of the rest of the stack, even in the case of a difference in height between back and front.

The problem posed is solved according to the invention by providing control means by which, after the back of the led-off stack has passed the shutter, a relative movement can be established between the shutter and the led-off stack in such a way that the shutter comes in contact with the surface of the led-off stack and the contact is maintained, and that the control means bring about an opposite relative movement as soon as the led-off stack has passed the shutter.

As control means there serves a sensor arranged at the height of the shutter in the bearing surface for the stack.

Preferably, there serves as sensor a light barrier or a switch corresponding to the change of pressure of an air stream. By the stack moved past under the shutter then either a light beam is interrupted or an air stream directed from underneath against the led-off stack is prevented from emergence, so that in consequence of the pressure difference thereby brought about a switch can be actuated.

By the sensor, there can be brought about on its activation either a raising of the bearing surface or a lowering of the shutter. In both cases the lower end of the shutter comes in contact with the upper side of the led-off stack, and this contact is maintained until the stack again frees the sensor.

In advantageous development of the invention the lower end of the shutter is constructed as an element adjustable in height. There the adjustable element is held in its raised position by spring force, and there is provided a hydraulic or pneumatic cylinder, the piston of which on activation of the sensor moves the adjustable element downwards against the spring force in the direction of the just-shifted stack.

In order to protect the surface of the uppermost product of the stack from damage of scratching, the adjustable element is provided with one or more balls or rolls projecting beyond its lower end.

In order to reduce the friction between the lower product of the retained stack and the upper product of the led-off stack, it is further advantageous to provide at the lower end of the adjustable element a passage for blowing air, so that an air cushion can be established between the products moved relatively to one another. Since the blowing air passage is moved with the adjustable element, the air cushion can be maintained during the entire shifting movement of the stack, which in the case of a rigid arrangement of the shutter would be possible only at the start of the sliding-out process. This is explained in detail in the following with the aid of an example of execution represented in the drawing.

Figure 2:
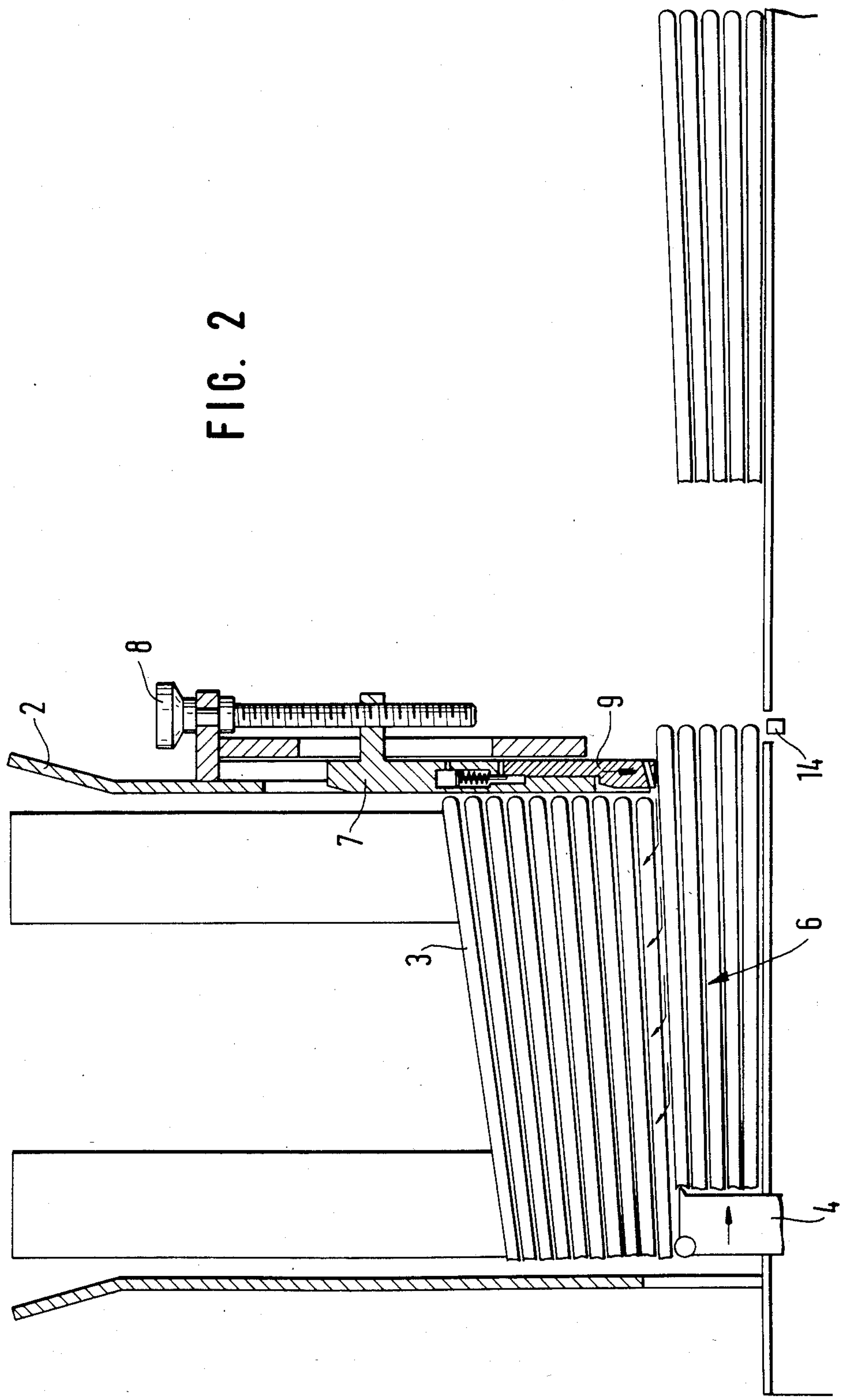
Figure 3:
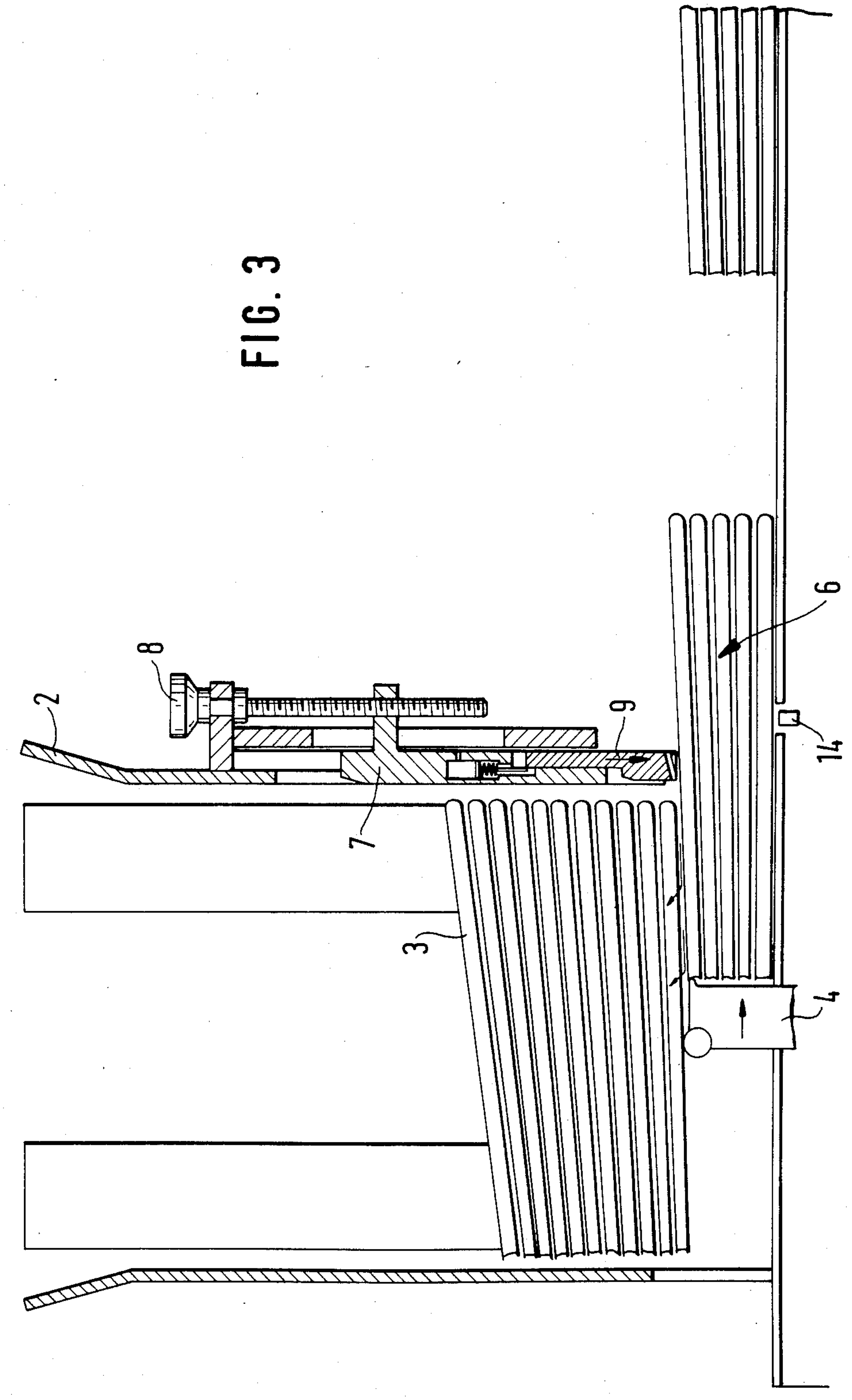
Figure 4:
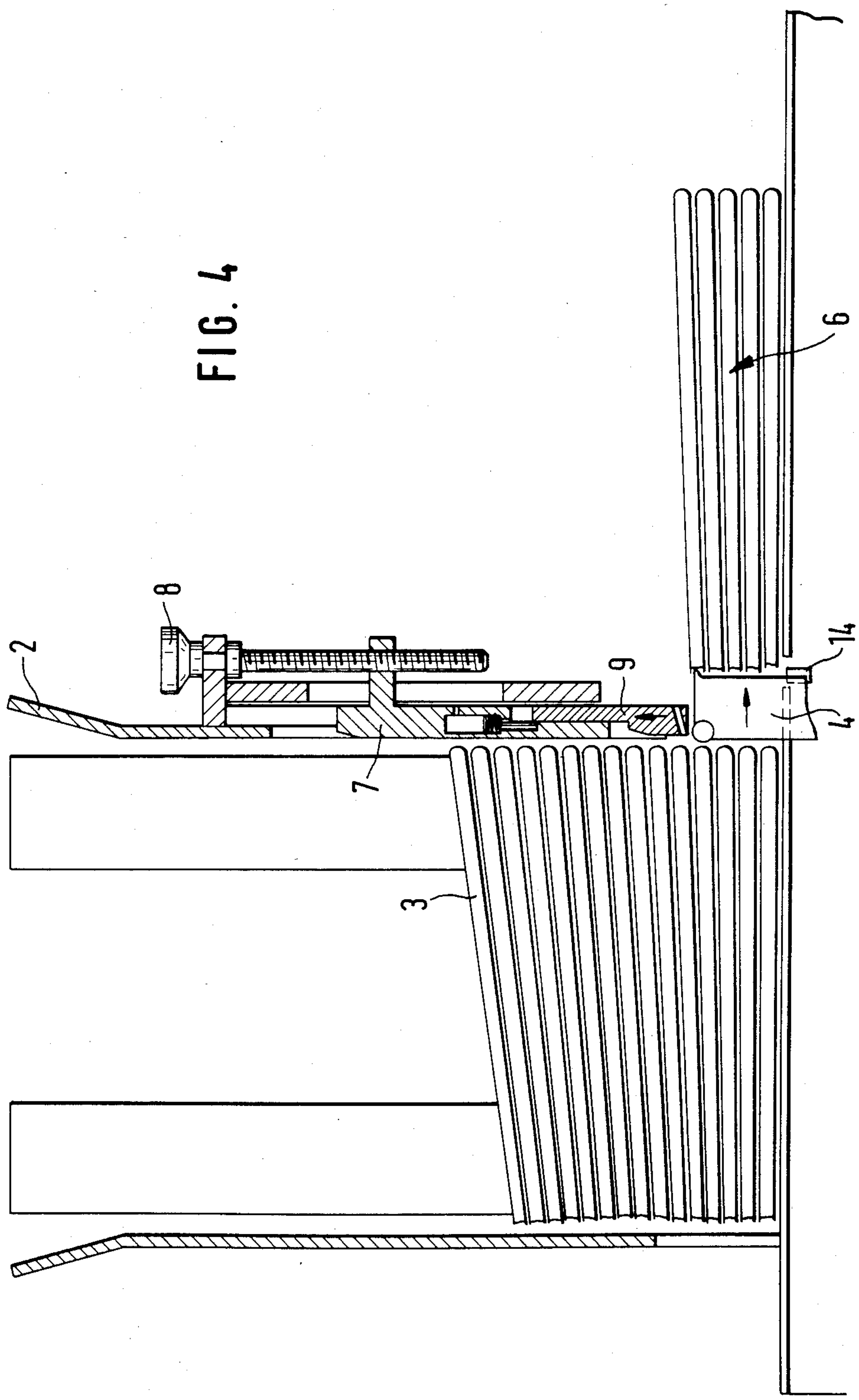

In the drawing:

FIG. 1 presents a cross section representation of a magazine belonging to a three-knife cutting machine before the sliding out of a stack of products to be cut;

FIG. 2 presents the magazine in the same representation as in FIG. 1 shortly after the start of the sliding-out of the stack;

FIG. 3 presents the magazine after the stack has been about half pushed out; and FIG. 4 presents the magazine after completion of the sliding-out process.

Above a table 1, there is present a magazine 2, into which from above from a production line for books, or the like, the products 3 are fed, say, from an adhesive binder. Inside the table 1, there are slidable in longitudinal direction carriers emplaced on chains or mechanically controlled pushers 4. The carriers 4 are adjustable in height, so that depending on the setting chosen there can be pushed out a predetermined number of products 3 in the direction of the arrow 5 from the magazine 2. In the example of execution represented, the height of the carrier 5 is set for five products.

The pushing-out of the stack 6 occurs there with the back side forward. Facing the back of the products 3 is a shutter 7, which is borne by means of a spindle 8 adjustable in elevation on the magazine 2. The height is adjusted there in correspondence to the height of the follower 5 in such a way that only the stack 6 consisting of five products can be thrust through, while the rest of the stack remaining over it is retained.

It is perceptible that the products 3 are thicker at the back than at the front, so that it is evident that with a rigid shutter the distance between the lower end of the shutter and the surface of the pushed-out stack becomes greater and greater, the further the stack 6 is thrust forward. This, in the case of thin products, can lead to the result that the lowest product is finally carried along from the rest of the stack by friction and leads to disturbances in the machine run-off.

The invention now provides that the lower end of the shutter 7 is constructed as an element 9 adjustable in height. The element 9 is guided in the shutter 7 and is held in the starting position by a spring 10 in its raised position, in which it lies on a stock 11 of the shutter 7. The element 9 is connected with a piston movable up and down in a cylinder 12, in which system the cylinder 12 can be acted upon over a line 13 with a pressure medium. On action upon the cylinder, the piston is moved downward against the force of the spring 10.

The control of the feed of the pressure medium occurs over a sensor 14, which acts through an opening in the table 1 and is arranged about at the height of the shutter 7. The sensor 14 may consist of a light barrier, but it can also be constructed as a compressed air sensor, in which air is blown upward with low pressure and the air escape is suppressed as soon as the stack 6 runs over the sensor 14, and the pressure difference thereby generated in the sensor can be utilized for the triggering of a switch which frees the feed of the pressure medium to the cylinder 12.

At the lower end of the adjustable element 9, there are provided, further, one or several passages 15 which are directed in such a way that from their opening air can be blown between the stack 6 to be led off and the rest of the stack, in order to reduce the friction.

Further, beyond the lower end of the adjustable element 9 one or more balls or rolls 16 project, which come into position on the upper side of the stack 6 to be led off and prevent any damage to the surface of the uppermost product of the stack 6.

FIG. 2 shows the state in which the stack to be pushed out has just passed the sensor 14, so that the feed of pressure medium to the cylinder 12 has been triggered and thereby the adjustable element 9 has come into engagement on the surface of the stack 6.

In FIG. 3, the stack 6 has been thrust out about halfway from the magazine 2, and it is to be seen from FIGS. 2 and 3, that during the entire sliding-out movement the opening of the passages 15 remains directed upon the interspace between the pushed-out stack 6 and the rest of the stack, which would not be the case with a rigid shutter, since then with increase out-thrust the back of the lowest product of the residual stack would pass in front of the outlet openings of the passages 15.

In FIG. 4, the stack 6 has left the magazine, in which now the rest of the stack has dropped onto the table 1, and the thrust-out stack now frees the sensor 14, so that now the cylinder 12 is relieved of pressure and the adjustable element 9, through the action of the spring, can return again upward into the starting position. The carrier 5 then plunges downward and away, and the next carri.er appears at the front of the magazine, so that the entire cycle runs off again.

In the example of execution represented and described, an adjustable element is provided on the shutter, in order to adapt the shutter gap to the particular momentary height of the stack. Instead of this, however, also the table 1 could be driven in the zone of the magazine or an extensible supporting member, so that the stack to be thrust out would then be lifted against the then rigid lower end of the shutter.

Instead of a hydraulic or pneumatic control for the adaptation of the shutter gap, the control can also occur by means of an electromagnet or by servo-motors.

It is also possible to use other types of sensors, for example, approximation initiators.

What is claimed is:

1. A three-knife cutting machine for trimming the front side and the head and foot side of brochures, books, and the like, in which the back side is thicker than the front side, the products to be trimmed are disposed in stacks in a magazine that is continuously chargeable from above, with the back side of the products being disposed adjacent an exit opening in said magazine, adjustable means for pushing a desired stack height from the magazine to a cutting station, an adjustable shutter means disposed in a preselected position adjacent the backside of the products to be trimmed which serves to retain the products remaining over the stack to be led off, control means for adjusting the position of the shutter means to maintain the shutter means in contact with the stack being led off and for returning the shutter to its preselected position after the led off stack has passed the shutter.

2. A three-knife cutting machine according to claim 1 in which the control means consists of sensor disposed adjacent the back side of the stack to be led off.

3. A three-knife cutting machine according to claim 2 in which the sensor consists of a light barrier.

4. A three-knife cutting machine according to claim 2 in which the sensor consists of a switch responding to changing of the pressure of an air stream.

5. A three-knife cutting machine according to claim 2 in which when the led off stack passes the sensor the control means is actuated to return the shutter to its preselected position.

6. A three-knife cutting machine in accordance with claim 5 in which the lower end of the shutter means includes an element adjustable in height.

7. A three-knife cutting machine in accordance with claim 6 in which the adjustable element is maintained in its raised position by a spring means and the control means includes a piston and cylinder assembly in which the position of said piston is controlled by said sensor, which piston is moved against said spring force to maintain the shutter means in contact with the stack being removed from the magazine.

8. A three-knife cutting machine in accordance with claim 7 in which the adjustable element is provided with a ball means projecting beyond its lower end.

9. A three-knife cutting machine in accordance with claim 7 in which the lower end of the adjustable element defines a passage for blowing air such that an air cushion is formed between the stack being led off from the magazine and that portion of the stack being held back by the shutter.

10. A method of removing from a magazine a partial stack of brochures, books, or the like, in which the back side thereof which leaves the magazine first is thicker than the front side while maintaining the balance of the stack in said magazine consisting of the steps of forming a preselected exit opening for said partial stack, pushing said partial stack out of said exit opening, and reducing the size of said exit opening to accommodate the reduction of height of said partial stack to insure that only the preselected stack will be removed from said magazine.

11. A method as set forth in claim 10 wherein after the partial stack is removed from the magazine the magazine exit opening is automatically reset for said preselected opening.

* * * * *